United States Patent
Ji et al.

(10) Patent No.: US 12,411,383 B2
(45) Date of Patent: *Sep. 9, 2025

(54) LIQUID CRYSTAL DISPLAY PANEL AND METHOD OF MANUFACTURING THE SAME, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Lintao Ji, Beijing (CN); Feifei Wang, Beijing (CN); Kaixuan Wang, Beijing (CN); Hongming Zhan, Beijing (CN); Bowen Li, Beijing (CN); Jiao Li, Beijing (CN); Xibin Shao, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,904

(22) Filed: Feb. 7, 2024

(65) Prior Publication Data
US 2024/0176190 A1    May 30, 2024

Related U.S. Application Data

(63) Continuation of application No. 17/612,586, filed as application No. PCT/CN2021/074477 on Jan. 29, 2021, now Pat. No. 11,921,376.

(51) Int. Cl.
*G02F 1/13363* (2006.01)
*G02F 1/1335* (2006.01)
*G02F 1/1337* (2006.01)

(52) U.S. Cl.
CPC .. *G02F 1/133637* (2021.01); *G02F 1/133531* (2021.01); *G02F 1/1337* (2013.01);
(Continued)

(58) Field of Classification Search
CPC ......... G02F 1/133637; G02F 1/133531; G02F 1/1337; G02F 2201/56; G02F 2413/08; G02F 2413/13
See application file for complete search history.

(56) References Cited

U.S. PATENT DOCUMENTS 6,115,095 A    9/2000  Suzuki et al.
6,693,693 B1   2/2004  Okita et al.
(Continued)

FOREIGN PATENT DOCUMENTS

CN    1292099 A    4/2001
CN    1777834 A    5/2006
(Continued)

OTHER PUBLICATIONS

China National Intellectual Property Administration, "Notification of Grant of Invention Patent Rights", Application No. 202180000113.X, Jul. 12, 2023.
(Continued)

*Primary Examiner* — Michael H Caley
*Assistant Examiner* — David Y Chung
(74) *Attorney, Agent, or Firm* — The Webb Law Firm

(57) ABSTRACT

A liquid crystal display panel includes a first base, a second base disposed opposite to the first base, a liquid crystal layer and a first optical compensation layer that are disposed between the first base and the second base, and a second optical compensation layer disposed on a side of the first base away from the liquid crystal layer or on a side of the second base away from the liquid crystal layer. An orthogonal projection of an optic axis of the first optical compen-
(Continued)

sation layer on the first base is parallel to orthogonal projections of optic axes of liquid crystal molecules in the liquid crystal layer on the first base. An orthogonal projection of an optic axis of the second optical compensation layer on the first base is perpendicular to the orthogonal projection of the optic axis of the first optical compensation layer on the first base.

19 Claims, 7 Drawing Sheets

(52) U.S. Cl.
CPC ...... *G02F 2201/56* (2013.01); *G02F 2413/08* (2013.01); *G02F 2413/13* (2013.01)

(56) References Cited

U.S. PATENT DOCUMENTS

| | | | |
|---|---|---|---|
| 10,640,577 | B2 | 5/2020 | Boone et al. |
| 11,921,376 | B2* | 3/2024 | Ji .................... G02F 1/13363 |
| 2005/0140900 | A1 | 6/2005 | Jeon et al. |
| 2010/0188621 | A1 | 7/2010 | Nakanishi |
| 2010/0328593 | A1 | 12/2010 | Woo et al. |
| 2013/0229588 | A1* | 9/2013 | Nishida ............. G02F 1/134363 349/33 |
| 2019/0025626 | A1 | 1/2019 | Chen et al. |
| 2019/0227364 | A1 | 7/2019 | Kawamura et al. |
| 2019/0353957 | A1 | 11/2019 | Atsumi et al. |
| 2020/0183212 | A1 | 6/2020 | Jia et al. |
| 2020/0371399 | A1 | 11/2020 | Liu et al. |
| 2021/0122909 | A1* | 4/2021 | Mun ................. G02F 1/133528 |
| 2021/0181398 | A1 | 6/2021 | Emori et al. |
| 2022/0187522 | A1* | 6/2022 | Kim .................... B32B 27/304 |

FOREIGN PATENT DOCUMENTS

| | | |
|---|---|---|
| CN | 1834750 A | 9/2006 |
| CN | 105911771 A | 8/2016 |
| CN | 107145002 A | 9/2017 |
| CN | 108761925 A | 11/2018 |
| CN | 109791327 A | 5/2019 |
| CN | 209373164 U | 9/2019 |
| CN | 211014954 U | 1/2020 |
| CN | 211979379 U | 11/2020 |
| JP | 2815870 B2 | 10/1998 |
| JP | 2006201449 A | 8/2006 |
| JP | 2008051838 A | 3/2008 |
| KR | 1020090071081 A | 7/2009 |

OTHER PUBLICATIONS

Patent Cooperation Treaty, "International Search Report", PCT/CN2021/074477, Nov. 1, 2021.
United States Patent and Trademark Office, "Non-Final Office Action", U.S. Appl. No. 17/612,586, Nov. 6, 2023.
United States Patent and Trademark Office, "Notice of Allowability and Fee(s) Due", U.S. Appl. No. 17/612,586, Oct. 23, 2023.
United States Patent and Trademark Office, " Corrected Notice of Allowability", U.S. Appl. No. 17/612,586, Nov. 6, 2023.
United States Patent and Trademark Office, "Non-Final Office Action", U.S. Appl. No. 17/612,586 filed Jul. 7, 2023.

* cited by examiner

LIQUID CRYSTAL DISPLAY PANEL AND METHOD OF MANUFACTURING THE SAME, AND DISPLAY DEVICE

CROSS-REFERENCE TO RELATED APPLICATIONS

This application is a continuation of U.S. patent application Ser. No. 17/612,586, filed Jan. 29, 2021, which is the United States national phase of International Patent Application No. PCT/CN2021/074477, filed Jan. 29, 2021, the disclosures of which are hereby incorporated by reference in their entireties.

BACKGROUND OF THE INVENTION

Field of the Invention

The present disclosure relates to the field of display technologies, and in particular, to a liquid crystal display panel and a method of manufacturing the same, and a display device.

Description of Related Art

With advantages such as a small size, low consumption, and no radiation, liquid crystal display (LCD) is a type of display that is widely used at present.

SUMMARY OF THE INVENTION

In an aspect, a liquid crystal display panel is provided. The liquid crystal display panel includes: a first base, a second base disposed opposite to the first base, and a liquid crystal layer disposed between the first base and the second base. The liquid crystal display panel further includes a first optical compensation layer and a second optical compensation layer. The first optical compensation layer is disposed between the first base and the second base. An orthogonal projection of an optic axis of the first optical compensation layer on the first base is parallel to orthogonal projections of optic axes of liquid crystal molecules in the liquid crystal layer on the first base. The second optical compensation layer is disposed on a side of the first base away from the liquid crystal layer, or disposed on a side of the second base away from the liquid crystal layer. An orthogonal projection of an optic axis of the second optical compensation layer on the first base is perpendicular to the orthogonal projection of the optic axis of the first optical compensation layer on the first base. A material of the first optical compensation layer and a material of the second optical compensation layer are both a material with positive dispersion; or a material of the first optical compensation layer is a material with positive dispersion, and a material of the second optical compensation layer is a material with negative dispersion; or a material of the first optical compensation layer is a material with negative dispersion, and a material of the second optical compensation layer is a material with positive dispersion.

In some embodiments, a sum of an in-plane retardation of the first optical compensation layer and an in-plane retardation of the liquid crystal layer is equal to a positive integral multiple of a first wavelength. The first wavelength is in a range of 535 nm±50 nm.

In some embodiments, the in-plane retardation of the first optical compensation layer is in a range of 145 nm to 240 nm; and the in-plane retardation of the liquid crystal layer is in a range of 310 nm to 390 nm.

In some embodiments, the in-plane retardation of the first optical compensation layer is in a range of 185 nm±5 nm; and the in-plane retardation of the liquid crystal layer is in a range of 350 nm±5 nm.

In some embodiments, an in-plane retardation of the second optical compensation layer is in a range of 115 nm±550 nm×N to 200 nm±550 nm×N. N is an integer greater than or equal to 0.

In some embodiments, an in-plane retardation of the second optical compensation layer is in a range of (147 nm±10 nm)+550 nm×N. N is an integer greater than or equal to 0.

In some embodiments, the first optical compensation film is a +A compensation film layer; and/or, the second optical compensation film is a +A compensation film layer. In some embodiments, the first optical compensation layer and the second optical compensation layer are located on a same side of the liquid crystal layer; or the first optical compensation layer and the second optical compensation layer are located on two sides of the liquid crystal layer.

In some embodiments, the liquid crystal display panel further includes a first polarizer located on the side of the first base away from the liquid crystal layer, and a second polarizer located on the side of the second base away from the liquid crystal layer. A transmission axis of the second polarizer is perpendicular to a transmission axis of the first polarizer. Orthogonal projections of the optic axes of the liquid crystal molecules in the liquid crystal layer on the first polarizer are parallel to or perpendicular to the transmission axis of the first polarizer.

In some embodiments, the first optical compensation layer is an optical compensation layer based on liquid crystal molecules or an optical compensation layer based on a stretched polymer film; and/or, the second optical compensation layer is an optical compensation layer based on liquid crystal molecules or an optical compensation layer based on a stretched polymer film.

In some embodiments, the liquid crystal display panel is of a planar structure or a curved structure.

In another aspect, a display device is provided. The display device includes the liquid crystal display panel according to any one of the above embodiments, and a backlight module disposed on a side of the liquid crystal display panel.

In some embodiments, in a case where the liquid crystal display panel includes the first polarizer and the second polarizer, and orthogonal projections of the optic axes of the liquid crystal molecules in the liquid crystal layer on the first polarizer are parallel to the transmission axis of the first polarizer, the backlight module is located on a side of the first polarizer away from the liquid crystal layer, and the first optical compensation layer and the second optical compensation layer are both located on a side of the liquid crystal layer away from the first polarizer.

In some embodiments, in a case where the liquid crystal display panel includes the first polarizer and the second polarizer, and orthogonal projections of the optic axes of the liquid crystal molecules in the liquid crystal layer on the first polarizer are perpendicular to the transmission axis of the first polarizer, the backlight module is located on a side of the first polarizer away from the liquid crystal layer, the first optical compensation layer is located on a side of the liquid crystal layer away from the first polarizer, and the second optical compensation layer is located on a side of the liquid crystal layer proximate to the first polarizer.

In yet another aspect, a liquid crystal display panel is provided. The liquid crystal display panel includes: a first base, a second base disposed opposite to the first base, and a liquid crystal layer disposed between the first base and the second base. The liquid crystal display panel further includes a first optical compensation layer and a second optical compensation layer. The first optical compensation layer is disposed between the first base and the second base. An orthogonal projection of an optic axis of the first optical compensation layer on the first base is parallel to orthogonal projections of optic axes of liquid crystal molecules in the liquid crystal layer on the first base. The second optical compensation layer is disposed on a side of the first base away from the liquid crystal layer, or disposed on a side of the second base away from the liquid crystal layer. An orthogonal projection of an optic axis of the second optical compensation layer on the first base is perpendicular to the orthogonal projection of the optic axis of the first optical compensation layer on the first base. A sum of an in-plane retardation of the first optical compensation layer and an in-plane retardation of the liquid crystal layer is equal to a positive integral multiple of a first wavelength, and the first wavelength is in a range of 535 nm±50 nm. The in-plane retardation of the first optical compensation layer is in a range of 160 nm to 190 nm; and the in-plane retardation of the liquid crystal layer is in a range of 310 nm to 390 nm. An in-plane retardation of the second optical compensation layer is in a range of 134 nm to 200 nm±550 nm×N, N being an integer greater than or equal to 0.

In some embodiments, the first optical compensation film is a +A compensation film layer; and/or, the second optical compensation film is a +A compensation film layer.

In some embodiments, a material of the first optical compensation layer and a material of the second optical compensation layer are both a material with positive dispersion; or a material of the first optical compensation layer is a material with positive dispersion, and a material of the second optical compensation layer is a material with negative dispersion; or a material of the first optical compensation layer is a material with negative dispersion, and a material of the second optical compensation layer is a material with positive dispersion.

In some embodiments, the liquid crystal display panel further includes a first polarizer located on the side of the first base away from the liquid crystal layer, and a second polarizer located on the side of the second base away from the liquid crystal layer. A transmission axis of the second polarizer is perpendicular to a transmission axis of the first polarizer. Orthogonal projections of the optic axes of the liquid crystal molecules in the liquid crystal layer on the first polarizer are parallel to or perpendicular to the transmission axis of the first polarizer.

In yet another aspect, a display device is provided. The display device includes the liquid crystal display panel according to any one of the above embodiments, and a backlight module disposed on a side of the liquid crystal display panel.

In yet another aspect, a method of manufacturing a liquid crystal display panel is provided. The method includes:
providing a first base and a second base;
forming a liquid crystal layer between the first base and the second base;
forming a first optical compensation layer between the first base and the second base, an orthogonal projection of an optic axis of the first optical compensation layer on the first base being parallel to orthogonal projections of optic axes of liquid crystal molecules in the liquid crystal layer on the first base; and
forming a second optical compensation layer on a side of the first base away from the liquid crystal layer or on a side of the second base away from the liquid crystal layer, an orthogonal projection of an optic axis of the second optical compensation layer on the first base being perpendicular to the orthogonal projection of the optic axis of the first optical compensation layer on the first base.

A material of the first optical compensation layer and a material of the second optical compensation layer are both a material with positive dispersion; or a material of the first optical compensation layer is a material with positive dispersion, and a material of the second optical compensation layer is a material with negative dispersion; or a material of the first optical compensation layer is a material with negative dispersion, and a material of the second optical compensation layer is a material with positive dispersion.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on actual sizes of products, actual processes of methods and actual timings of signals involved in the embodiments of the present disclosure.

DESCRIPTION OF THE INVENTION

Figure 1:
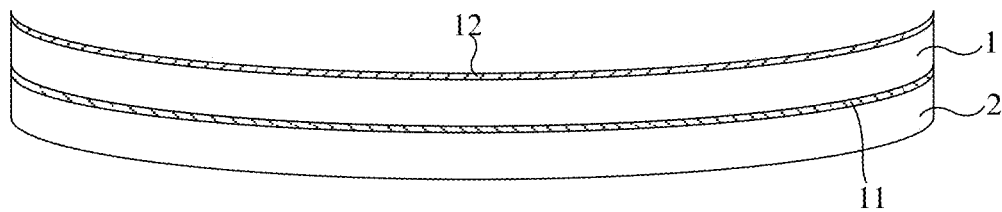
FIG. 1 is a diagram showing a structure of a display device, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The use of the phrase "applicable to" or "configured to" herein indicates an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art in view of the measurement in question and the errors associated with the measurement of the particular quantity (i.e., the limitations of the measurement system). For example, the term "parallel" includes absolute parallelism and approximate parallelism, and an acceptable range of deviation of approximate parallelism may be, for example, a deviation within 5°; the term "perpendicular" includes absolute perpendicularity and approximate perpendicularity, and an acceptable range of deviation of approximate perpendicularity may also be, for example, a deviation within 5°; and the term "equal" includes absolute equality and approximate equality, and an acceptable range of deviation of approximate equality may be, for example, a difference between two equals, which is less than or equal to 5% of either.

It will be noted that, the stated condition herein is described relative to a same sub-region of a subject that is requested to be protected. Further, the stated condition herein is described relative to a same sub-region of a liquid crystal display panel. The term "a same sub-region" may be understood as a region where a pixel of the liquid crystal display panel is located, or may be understood as a region represented by a square of 1 μm×1 μm, 1 mm×1 mm, 1 cm×1 cm, or 1 dm×1 dm circled in an entire display region of the liquid crystal display panel. Of course, the region is not limited to a square shape, and it may also be a circle, an ellipse or other irregular shapes with a same or approximately same area. In addition, in a case where the liquid crystal display panel is a curved liquid crystal display panel, a same sub-region in the liquid crystal display panel may be approximately regarded as a partial region of a flat liquid crystal display panel, so as to facilitate the description of its structure.

Exemplary embodiments are described herein with reference to cross-sectional views and/or plan views as idealized exemplary drawings. In the accompanying drawings, thicknesses of layers and sizes of regions are enlarged for clarity. Variations in shape with respect to the drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown as a rectangular shape generally has a feature of being curved. Therefore, the regions shown in the accompanying drawings are schematic in nature, and their shapes are not intended to show actual shapes of the region in a device, and are not intended to limit the scope of the exemplary embodiments.

Moreover, the liquid crystal display panel shown in the schematic diagrams is in a state when no voltage is applied thereto. It will be understood that, after voltages are applied to the liquid crystal display panel, at least a part of liquid crystal molecules in the liquid crystal display panel will change their direction, thereby realizing a display function.

Referring to FIG. 1, some embodiments of the present disclosure provide a display device 100. For example, the display device 100 may be an advanced super dimension switch (ADS) display device 100.

For example, the display device 100 may be any device that displays an image whether in motion (e.g., a video) or fixed (e.g., a still image), and whether literal or graphical. The display device 100 may include, but are not limited to, a mobile phone, a wireless device, a personal digital assistant (PDA), a handheld or portable computer, a global positioning system (GPS) receiver/navigator, a camera, a MPEG-4 Part 14 (MP4) video player, a video camera, a game console, a flat panel display, a computer monitor and a vehicle display (e.g., a vehicle driving recorder or a backup camera), etc.

With continued reference to FIG. 1, for example, the display device 100 may include a liquid crystal display panel 1 and a backlight module 2. The backlight module 2 may be used for providing a light source for the display of the liquid crystal display panel 1. For example, the liquid crystal display panel 1 may be of a planar structure or a curved structure.

Figure 2A:
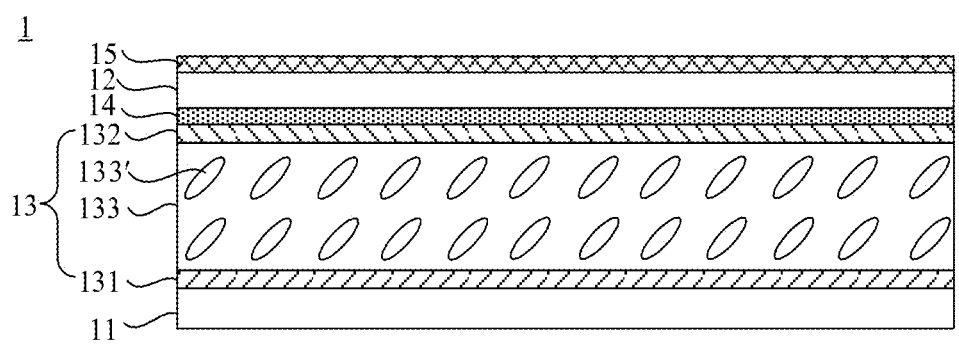
FIG. 2A is a diagram showing a structure of a liquid crystal display panel, in accordance with some embodiments.
Figure 2B:
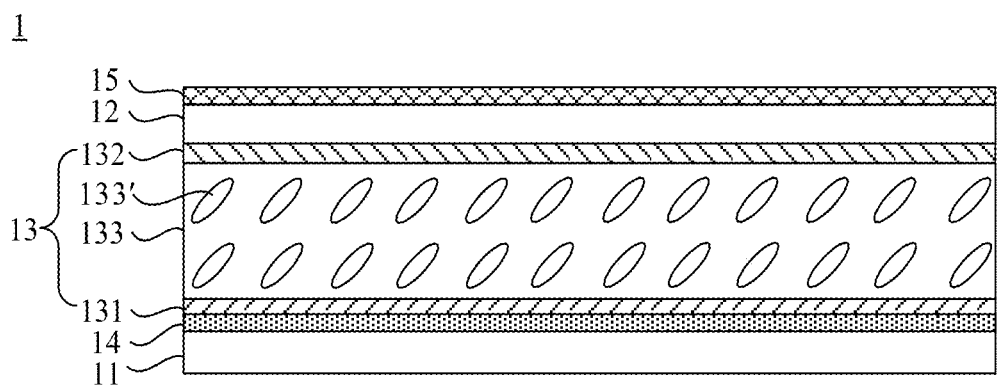
FIG. 2B is a diagram showing a structure of another liquid crystal display panel, in accordance with some embodiments.
Figure 2C:
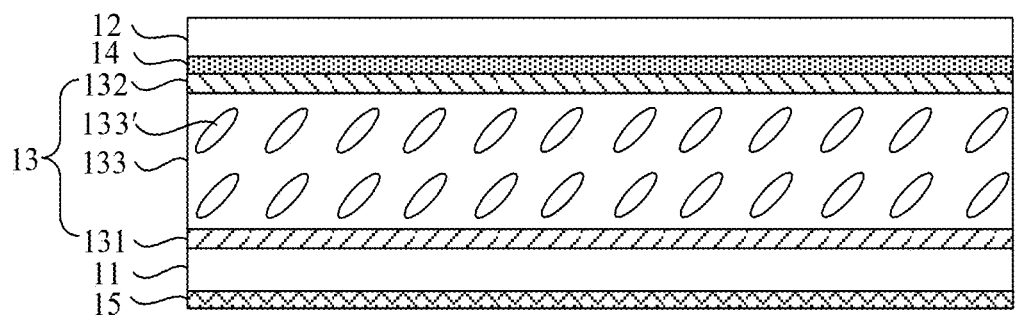
FIG. 2C is a diagram showing a structure of yet another liquid crystal display panel, in accordance with some embodiments.

Referring to FIGS. 2A to 2C, some embodiments of the present disclosure provide a liquid crystal display panel 1. The liquid crystal display panel 1 includes a first base 11 and a second base 12 that are arranged opposite to each other, and a liquid crystal layer 13 disposed between the first base 11 and the second base 12.

The liquid crystal layer 13 includes liquid crystal molecules (for convenience of description, the liquid crystal molecules in the liquid crystal layer 13 are referred to as first liquid crystal molecules 133' below). The first base 11 and the second base 12 may be made of the same material, for example, glass, or may, of course, be made of different materials, which is not limited in the present disclosure.

In some examples, the first base 11 is a base in an array substrate; correspondingly, the second base 12 is a base in an opposite substrate (e.g., a color filter substrate). In some other examples, the first base 11 is a base in an opposite substrate (e.g., a color filter substrate); correspondingly, the second base 12 is a base in an array substrate.

Based on this, with continued reference to FIGS. 2A to 2C, the liquid crystal display panel 1 further includes a first optical compensation layer 14 and a second optical compensation layer 15.

The first optical compensation layer 14 is disposed between the first base 11 and the liquid crystal layer 13 (as shown in FIG. 2B), or disposed between the second base 12 and the liquid crystal layer 13 (as shown in FIGS. 2A and 2C). An orthogonal projection of an optic axis of the first optical compensation layer 14 on the first base 11 is parallel to orthogonal projections of optic axes of the first liquid crystal molecules 133' in the liquid crystal layer 13 on the first base 11.

The second optical compensation layer 15 is disposed on a side of the first base 11 away from the liquid crystal layer 13 (as shown in FIG. 2C), or disposed on a side of the second base 12 away from the liquid crystal layer 13 (as shown in FIGS. 2A and 2B). An orthogonal projection of an optic axis of the second optical compensation layer 15 on the first base 11 is perpendicular to the orthogonal projection of the optic axis of the first optical compensation layer 14 on the first base 11.

It will be noted that, an optic axis (e.g., the optic axis of the first optical compensation layer 14, the optic axis of the second optical compensation layer 15, and the optic axis of the first liquid crystal molecule 133') is also referred to an optical axis. When light travels in a crystal, a direction in which two orthogonal waves travel at the same speed is an optic axis direction, and optical properties of light in this direction do not change. For example, a ray of light undergoes birefringence when being transmitted in an anisotropic crystal, however, when the ray of light is transmitted along an optic axis of the anisotropic crystal, the light does not undergo birefringence. Therefore, the optic axis of the anisotropic crystal may also be defined as a direction in which a ray of transmitted light suffers no birefringence.

In addition, anisotropic crystals may also be divided into uniaxial crystals and biaxial crystals. Uniaxial crystals have only one optic axis, while biaxial crystals have two optic axes.

Liquid crystal molecules are uniaxial crystals and have only one optic axis. Liquid crystal molecules may be divided into rod-like liquid crystal molecules and discotic liquid crystal molecules according to their shape. A long axis of the rod-like liquid crystal molecule is the optic axis; and a short axis of the discotic liquid crystal molecule is the optic axis. In some embodiments, the first liquid crystal molecules 133' in the liquid crystal layer 13 are all rod-like liquid crystal molecules.

In some embodiments, the liquid crystal layer 13 includes a first alignment film 131 and a second alignment film 132 that are disposed opposite to each other, and a liquid crystal molecular layer (for convenience of description, the liquid crystal molecular layer in the liquid crystal layer 13 being referred to as a first liquid crystal molecular layer 133 below) located between the first alignment film 131 and the second alignment film 132. The first liquid crystal molecules 133' are located in the first liquid crystal molecular layer 133.

The first alignment film 131 is configured to anchor first liquid crystal molecules 133', in the first liquid crystal molecular layer 133, that are proximate to the first alignment film 131, so that the first liquid crystal molecules 133' proximate to the first alignment film 131 have a first pretilt angle. For example, the first liquid crystal molecules 133' proximate to the first alignment film 131 are a layer of first liquid crystal molecules 133' that are most proximate to the first alignment film 131. As an illustration, FIGS. 2A to 2C only show the layer of first liquid crystal molecules 133', which are most proximate to the first alignment film 131, in the first liquid crystal molecular layer 133.

The second alignment film 132 is configured to anchor first liquid crystal molecules 133', in the first liquid crystal molecular layer 133, that are proximate to the second alignment film 132, so that the first liquid crystal molecules 133' proximate to the second alignment film 132 have a second pretilt angle. For example, the first liquid crystal molecules 133' proximate to the second alignment film 132 are a layer of first liquid crystal molecules 133' that are most proximate to the second alignment film 132. As an illustration, FIGS. 2A to 2C only show the layer of first liquid crystal molecules 133', which are most proximate to the second alignment film 132, in the first liquid crystal molecular layer 133, and the layer of first liquid crystal molecules 133', which are most proximate to the first alignment film 131, in the first liquid crystal molecular layer 133.

An alignment direction of the first alignment film 131 is the same as an alignment direction of the second alignment film 132.

The pretilt angle causes the liquid crystal molecule to be in a pre-tilted state, and the liquid crystal molecule in the pre-tilted state means that the liquid crystal molecule proximate to the alignment film is inclined in a specific direction relative to a plane where the alignment film is located. In some embodiments of the present disclosure, a long axis direction of the rod-like liquid crystal molecule intersects the plane where the alignment film is located, and the pretilt angle refers to an angle between the long axis direction of the rod-like liquid crystal molecule and an alignment direction of the alignment film. Pretilt angles presented by the first liquid crystal molecules 133' are angles (e.g., the first pretilt angles) between long axis directions of the first liquid crystal molecules 133' proximate to the first alignment film 131 and the alignment direction of the first alignment film 131, and angles (e.g., the second pretilt angles) between the long axis directions of the first liquid crystal molecules 133' proximate to the second alignment film 132 and the alignment direction of the second alignment film 132, in a state presented by the first liquid crystal molecules 133' when the liquid crystal display panel 1 is not energized or a voltage difference between a pixel electrode and a common electrode is 0.

The first optical compensation layer 14 includes an anisotropic crystal layer, which has at least one optic axis. In some embodiments, the first optical compensation layer 14 is a uniaxial optical compensation layer, which has only one optic axis. Based on this, for example, the first optical compensation layer 14 is a +A compensation film layer. In this case, the first optical compensation layer 14 satisfies a condition that nx1 is greater than ny1 and ny1 is approximately equal to nz1 (nx1>ny1=nz1) or nx1 is greater than ny1 and ny1 is equal to nz1 (nx1>ny1=nz1). Here, nx1 is an in-plane refractive index of the first optical compensation layer 14 in a direction of X1 axis, ny1 is an in-plane refractive index of the first optical compensation layer 14 in a direction of Y1 axis that is perpendicular to the X1 axis, and nz1 is a refractive index of the first optical compensation layer 14 in a thickness direction thereof. The X1 axis is the optic axis of the first optical compensation layer 14. It will be noted that, in a case where there is a small pretilt angle (e.g., a pretilt angle within 5°) between the X1 axis and a plane of the first optical compensation layer 14, the X1 axis may be considered to be in the plane of the first optical compensation layer 14. It will be understood that, in the case where there is the small pretilt angle between the X1 axis and the plane of the first optical compensation layer 14, there may be a certain difference between ny1 and nz1. Therefore, considering the above situation, ny1 may be set to be equal to or approximately equal to nz1.

The second optical compensation layer 15 also includes an anisotropic crystal layer, which has at least one optic axis. In some embodiments, the second optical compensation layer 15 is a uniaxial optical compensation layer, which has only one optic axis. Based on this, for example, the second optical compensation layer 15 is a +A compensation film layer. In this case, the second optical compensation layer 15 satisfies a condition that nx2 is greater than ny2 and ny2 is approximately equal to nz2 (nx2>ny2=nz2) or nx2 is greater than ny2 and ny2 is equal to nz2 (nx2>ny2=nz2). Here, nx2 is an in-plane refractive index of the second optical compensation layer 15 in a direction of X2 axis, ny2 is an in-plane refractive index of the second optical compensation layer 15 in a direction of Y2 axis that is perpendicular to the X1 axis, and nz2 is a refractive index of the second optical compensation layer 15 in a thickness direction thereof. The X2 axis is the optic axis of the second optical compensation layer 15. It will be noted that, in a case where there is a small pretilt angle (e.g., a pretilt angle within 5°) between the X2 axis and a plane of the second optical compensation layer 15, the X2 axis may be considered to be in the plane of the second optical compensation layer 15. It will be understood that, in the case where there is the small pretilt angle between the X2 axis and the plane of the second optical compensation layer 15, there may be a certain difference between ny2 and nz2. Therefore, considering the above situation, ny2 may be set to be equal to or approximately equal to nz2.

Figure 3A:
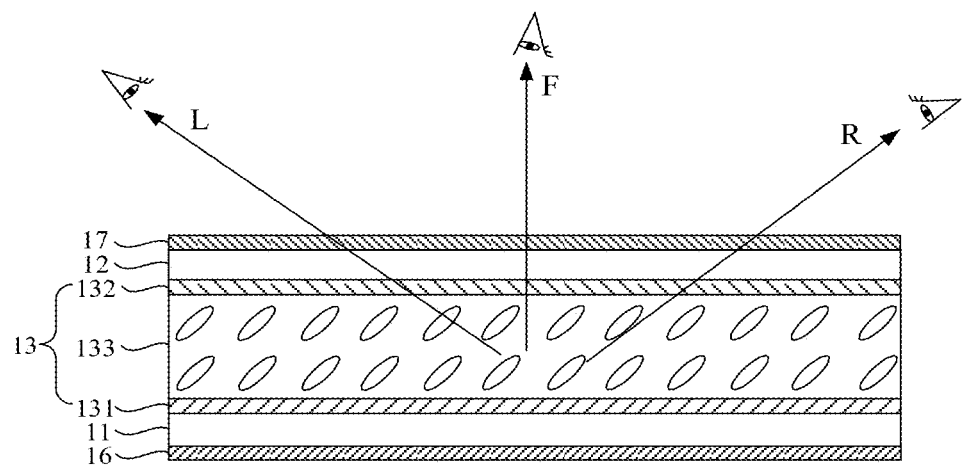
FIG. 3A is a diagram showing a structure of a liquid crystal display panel, in accordance with related art.

In the related art, referring to FIG. 3A, the liquid crystal display panel 01 has a light leakage problem in an L0 state. The L0 state refers to a state in which the liquid crystal display panel 01 is not energized and is in a dark state, while the backlight module normally provides the light source. When the liquid crystal display panel 01 is subjected to an external force (e.g., a pressing force applied to the liquid crystal display panel by the bezel, a bending force subjected by the liquid crystal display panel in a case where the liquid crystal display panel is of a curved structure, etc.) in the L0 state, the liquid crystal display panel 01 will be deformed, and the first base 11 and the second base 12 will also be deformed due to the force and thus a non-uniform stress is generated. The non-uniform stress will cause the first base 11 and the second base 12 to transform from isotropic mediums into optical anisotropic mediums, resulting in non-uniform birefringence of polarized light passing through the first base 11 and the second base 12; as a result, a polarization state of the polarized light will change. A phase retardation caused by the first base 11 and a phase retardation caused by the second base 12 have a same magnitude yet different directions. In a case where there is no liquid crystal layer 13 between the first base 11 and the second base 12, the two phase retardations may offset each other. However, due to the existence of the liquid crystal layer 13 between the first base 11 and the second base 12, there is a phase difference between the polarized light before passing through the liquid crystal layer 13 and the polarized light after passing through the liquid crystal layer 13, which results in that the phase retardation caused by the first base 11 and the phase retardation caused by the second base 12 cannot offset each other. For example, with continued reference to FIG. 3A, a first polarizer 16 is provided on a side of the first base 11 away from the liquid crystal layer 13, and a second polarizer 17 is provided on a side of the second base 12 away from the liquid crystal layer 13. Natural light emitted by the backlight module becomes linearly polarized light after passing through the first polarizer 16, and the linearly polarized light becomes elliptically polarized light due to phase retardations after passing through the first base 11, the liquid crystal layer 13 and the second base 12 in sequence; the elliptically polarized light may exit through the second polarizer 17 in the L0 state, resulting in light leakage. This is how pressure causes the light leakage problem.

Figure 3B:
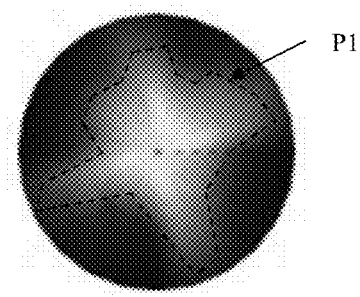
FIG. 3B is an optical simulation diagram of a display sub-region of a liquid crystal display panel with a curved structure in an L0 state, in accordance with related art.

In addition, the liquid crystal display panel 01 in the related art also has a color cast problem. Each pixel in the liquid crystal display panel 01 is composed of a red sub-pixel, a green sub-pixel and a blue sub-pixel, and different colors are presented by changing intensities of three colors of light (i.e., red light emitted by the red sub-pixel, green light emitted by the green sub-pixel and blue light emitted by the blue sub-pixel). Since liquid crystal molecule is a birefringent material, light will suffer birefringence (there exists two light components in a long axis direction and a short axis direction of the liquid crystal molecule) after entering tilted liquid crystal molecules, which causes a difference in Δn when the liquid crystal display panel 01 is viewed from different positions. Here, An is a difference between a refractive index n0 of extraordinary light and a refractive index ne of ordinary light, where the ordinary light is light that obeys the law of refraction, and the extraordinary light is light that does not obey the law of refraction. For a positive liquid crystal molecule, the refractive index no of the ordinary light corresponds to the short axis of the liquid crystal molecule no matter in what direction the light propagates; thus, the refractive index no of the ordinary light is constant. The refractive index ne of the extraordinary light changes as a direction in which the light propagates changes, and corresponds to an optic axis direction of the liquid crystal molecule. As a result, there is a difference in the transmittance of light with different wavelengths, and the transmission spectrums of the red light, the green light and the blue light change at different viewing angles, which finally lead to changes of the intensities of the red light, the green light and the blue light at different viewing angles. Based on this, the intensities of the red light, the green light and the blue light designed according to a front viewing angle (i.e., a normal direction F of a light exit surface of the liquid crystal display panel 01 in FIG. 3A) will inevitably deviate in side viewing angles (i.e., a direction L and a direction R in FIG. 3A), and thus there is a color deviation after the three colors of light are mixed. Therefore, the liquid crystal display panel has a color cast problem at the side viewing angle. For example, referring to FIG. 3A, in the elliptically polarized light which travels toward the second polarizer 17 from the second base 12 in the side viewing angle, blue light is closer to linearly polarized light than red light, and red light is closer to linearly polarized light than green light. In this way, it may be easier for red light and green light to pass through the second polarizer 17, thus there may be more red light and green light in leaked light and a yellowish color cast problem occurs, which may be easily perceived by the human eye. For example, FIG. 3B is an optical simulation diagram of a display sub-region of the liquid crystal display panel 01 with a curved structure in the L0 state. It will be noted that, in the optical simulation diagram shown in FIG. 3B, the closer to the position of the center, the smaller the viewing angle (i.e., an angle between a normal line of a position in the display sub-region, corresponding to the optical simulation diagram, of the liquid crystal display panel 01 and a connection line between the position and the human eye); and the viewing angle, from center to edge in FIG. 3B, is approximately in a range of 0° to 85°. As can be seen from FIG. 3B, in the liquid crystal display panel 01 in the related art, a yellowish color cast region P1 may be perceived at most of the viewing angles, and thus this region may be easily perceived by the human eye.

Therefore, the liquid crystal display panel 01 in the related art has the light leakage problem in the L0 state and the color cast problem.

The reason why the liquid crystal display panel 1 in the embodiments of the present disclosure does not have the light leakage problem in the L0 state and the color cast problem is described as follows. Since the polarizers in the liquid crystal display panel 1 also affect the polarization state of light, in order to facilitate an analysis of a state of light in the liquid crystal display panel 1, the analysis needs to be conducted under a condition that the liquid crystal display panel 1 in the embodiments of the present disclosure further includes the first polarizer 16 disposed on a side of the first base 11 away from the liquid crystal layer 14 and the second polarizer 17 disposed on a side of the second base 12 away from the liquid crystal layer 14.

Figure 4A:
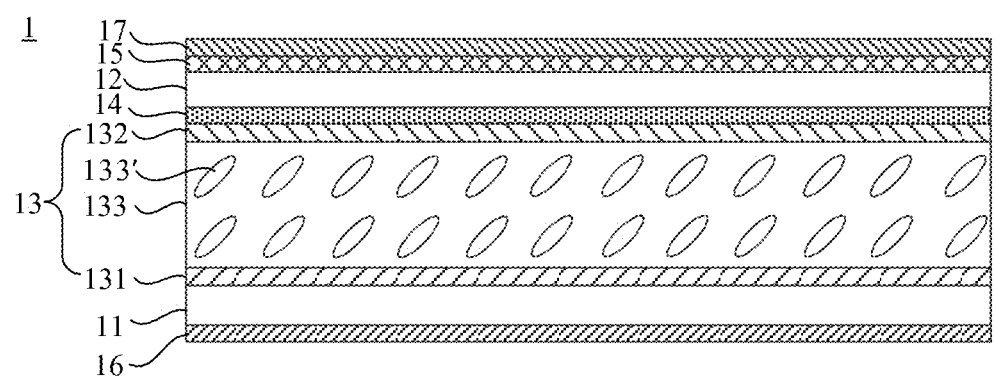
FIG. 4A is a diagram showing a structure of yet another liquid crystal display panel, in accordance with some embodiments.
Figure 4B:
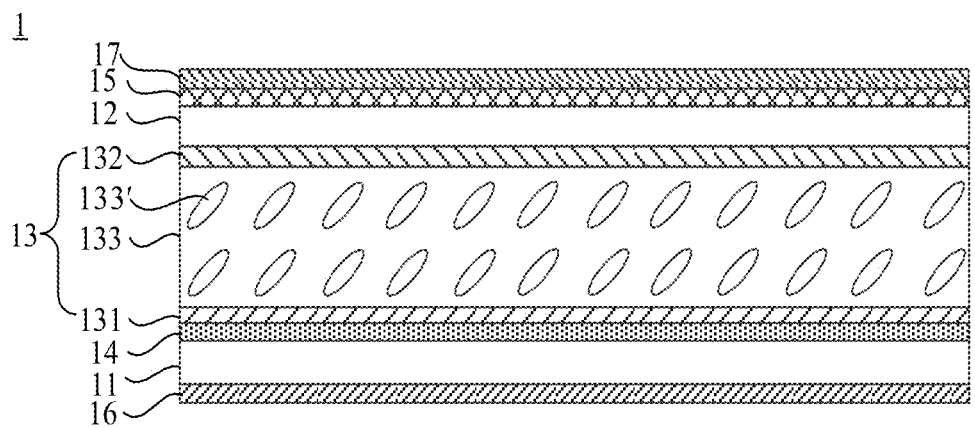
FIG. 4B is a diagram showing a structure of yet another liquid crystal display panel, in accordance with some embodiments.
Figure 4C:
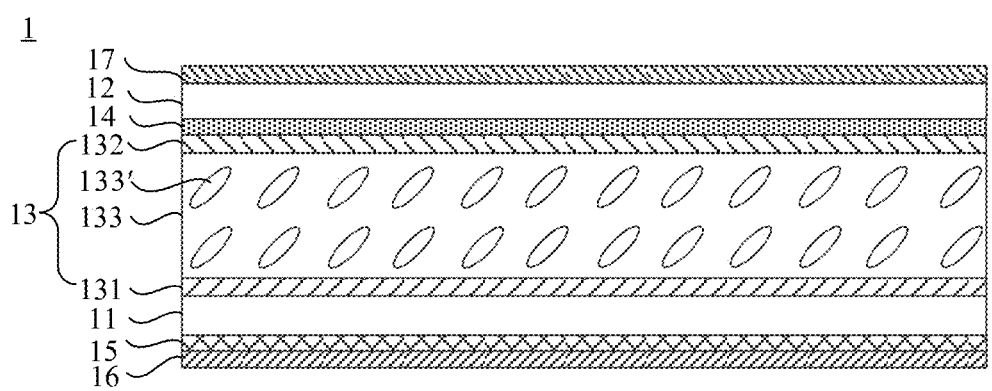
FIG. 4C is a diagram showing a structure of yet another liquid crystal display panel, in accordance with some embodiments.

In some embodiments, as shown in FIGS. 4A to 4C, the liquid crystal display panel 1 further includes the first polarizer 16 and the second polarizer 17. The first polarizer 16 is located on the side of the first base 11 away from the liquid crystal layer 13. The second polarizer 17 is located on the side of the second base 12 away from the liquid crystal layer 13. A transmission axis of the second polarizer 17 is perpendicular to a transmission axis of the first polarizer 16.

Positions of the first polarizer 16 and the second polarizer 17 may be set according to actual needs, which is not limited in the present disclosure. For convenience of description, in some embodiments of the present disclosure, the first polarizer 16 is located on a side of the liquid crystal display panel 1 facing the backlight module, and the second polarizer 17 is located on a side of the liquid crystal display panel 1 facing away from the backlight module. Based on this, the first polarizer 16 is configured to make light exiting from the backlight module 2 become linearly polarized light, and the second polarizer 17 is configured such that light whose polarization direction is perpendicular to the transmission axis of the second polarizer 17 cannot exit.

In any of the above embodiments, at least one of the first polarizer 16 and the second polarizer 17 is of a single-layer structure or a multi-layer structure. In some examples, a polarizer with a multi-layer structure includes at least a layer with a transmission axis, and a polarization direction of light passing through the layer is parallel to the transmission axis.

In the liquid crystal display panel 1 provided in the embodiments of the present disclosure, the first optical compensation layer 14 is located between the first base 11 and the second base 12, and the orthogonal projection of the optic axis of the first optical compensation layer 14 on the first base 11 is parallel to the orthogonal projections of the optic axes of the first liquid crystal molecules 133' in the liquid crystal layer 13 on the first base 11; therefore, the first optical compensation layer 14 has a positive compensation function, and is able to offset the phase retardation of the polarized light caused by the liquid crystal layer 13. In this way, the phase retardation caused by the first base 11 and the second base 12 may also be offset, and to a certain degree, the light exiting from the second base 12 may return to a polarization state thereof before entering the first base 11. For example, a polarization state of the linearly polarized light exiting from the first polarizer 16 is not easily change after the linearly polarized light passes through the first base 11, the liquid crystal layer 13, the first optical compensation layer 14 and the second base 12, and the linearly polarized light is perpendicular to the transmission axis of the second polarizer 17; thus, the linearly polarized light is unable to exit from the second polarizer 17. As such, when the liquid crystal display panel 1 is subjected to pressure in the L0 state, most of the light from the backlight module 2 is unable to exit from the liquid crystal display panel 1, thereby ameliorating the light leakage problem in the dark state caused by pressure.

Figure 3C:
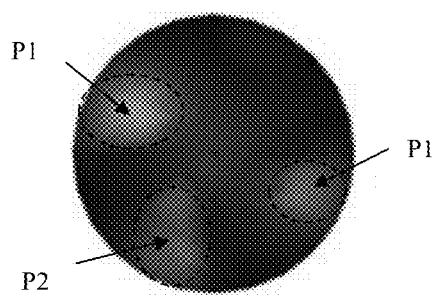
FIG. 3C is an optical simulation diagram of a display sub-region of a liquid crystal display panel with a curved structure (including a first optical compensation layer) in an L0 state, in accordance with some embodiments.

For example, FIG. 3C is an optical simulation diagram of a display sub-region of the liquid crystal display panel 1 with a curved structure (the liquid crystal display panel 1 includes the first optical compensation layer 14) in the L0 state. It will be noted that, in the optical simulation diagram shown in FIG. 3C, the closer to the position of the center, the smaller the viewing angle (i.e., an angle between a normal line of a position in the display sub-region, corresponding to the optical simulation diagram, of the liquid crystal display panel 1 and a connection line between the position and the human eye); and the viewing angle, from center to edge in FIG. 3C, is approximately in a range of 0° to 85°. As can be seen from FIG. 3C, in the liquid crystal display panel 1, the yellowish color cast region P1 and the greenish color cast region P2 may only be perceived at a few of the viewing angles, and the brightness of the yellowish color cast region P1 and the brightness of the greenish color cast region P2 in FIG. 3C are less than the brightness of the yellowish color cast region P1 in FIG. 3B. Therefore, the first optical compensation layer 14 is able to ameliorate the light leakage problem in the dark state caused by pressure and improve the yellowish color cast problem at most of the viewing angles in the related art.

Based on this, since the second optical compensation layer 15 is located on the side of the first base 11 or the second base 12 away from the liquid crystal layer 13, and the orthogonal projection of the optic axis of the second optical compensation layer 15 on the first base 11 is perpendicular to the orthogonal projection of the optic axis of the first optical compensation layer 14 on the first base 11 (i.e., the orthogonal projection of the optic axis of the second optical compensation layer 15 on the first base 11 is perpendicular to the orthogonal projections of the optic axes of the first liquid crystal molecules 133' in the liquid crystal layer 13 on the first base 11), the second optical compensation layer 15 is able to compensate the phase retardation of the polarized light passing through the second optical compensation layer 15 along side viewing angles, change the polarization state of the polarized light and offset an overall phase retardation of the liquid crystal layer 13 and the first optical compensation layer 14. In this way, it may be possible to reduce the changes of the transmission spectrums of red light, green light and blue light at different viewing angles, make the transmission spectrums of red light, green light and blue light at different viewing angles close to the transmission spectrums thereof at the front viewing angle; therefore, it may be possible to further reduce the changes in the intensities of the three colors of light at different viewing angles, reduce color deviation after the three colors of light after being mixed at the side viewing angle, and thus ameliorate the color cast problem.

Figure 3D:
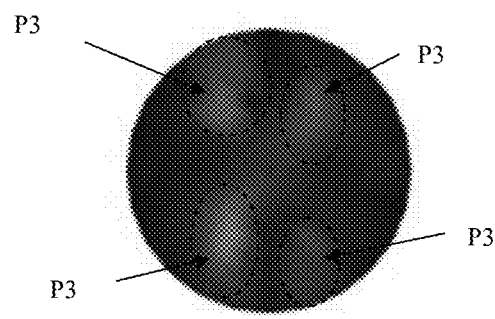
FIG. 3D is an optical simulation diagram of a display sub-region in a liquid crystal display panel with a curved structure (including a first optical compensation layer and a second optical compensation layer) in an L0 state, in accordance with some embodiments.

For example, FIG. 3D is an optical simulation diagram of a display sub-region of the liquid crystal display panel 1 with a curved structure (the liquid crystal display panel 1 includes the first optical compensation layer 14 and the second optical compensation layer 15) in the L0 state. It will be noted that, in the optical simulation diagram shown in FIG. 3D, the closer to the position of the center, the smaller the viewing angle (i.e., an angle between a normal line of a position in the display sub-region, corresponding to the optical simulation diagram, of the liquid crystal display panel 1 and a connection line between the position and the human eye); and the viewing angle, from center to edge in FIG. 3D, is approximately in a range of 0° to 85°. As can be seen from FIG. 3D, there are no yellowish color cast region P1 and greenish color cast region P2 in the liquid crystal display panel 1. In addition, in FIG. 3D, some of the purplish color cast regions may be improved to become bluish color cast regions P3. Therefore, the liquid crystal display panel 1 provided in the embodiments of the present disclosure is able to transform the majority of red light and green light into linearly polarized light when they enter the second polarizer 17 along the side viewing angles, and reduce the transmittance of the red light and green light; further, it is conducive to ameliorating the purplish color cast problem.

In addition, it will be noted that, since the liquid crystal display panel 1 with a planar structure is subjected to smaller external pressure (e.g., there is no bending force), in a case where the first optical compensation layer 14 and the second optical compensation layer 15 are provided, the bluish color cast region in the optical simulation diagram at a same sub-region of the liquid crystal display panel 1 with the planar structure is greater than that of the liquid crystal display panel 1 with the curved structure. That is, for a same sub-region of the liquid crystal display panel 1 with the planar structure, there is the bluish color cast effect at more viewing angles.

In some embodiments, as shown in FIG. 2A, the first optical compensation layer 14 and the second optical compensation layer 15 are located on the same side of the liquid crystal layer 13. In this case, the light leakage problem in the L0 state and the color cast problem at the side viewing angle in the liquid crystal display panel with such a structure may be ameliorated significantly, thus achieving a good display effect.

In some other embodiments, as shown in FIGS. 2B and 2C, the first optical compensation layer 14 and the second optical compensation layer 15 are located on two sides of the liquid crystal layer 13. In this case, the light leakage problem in the L0 state and the color cast problem at the side viewing angle in the liquid crystal display panel with such a structure may also be ameliorated significantly, thus achieving a good display effect.

In some embodiments, a sum of an in-plane retardation RO1 of the first optical compensation layer 14 and an in-plane retardation ROLC of the liquid crystal layer 13 is equal to a positive integral multiple of a first wavelength, the first wavelength being in a range of 535 nm±50 nm.

The in-plane retardation RO1 of the first optical compensation layer 14 is equal to a product of d1 and a difference of nx1 and ny1 (RO1=(nx1−ny1)×d1), where nx1 is the in-plane refractive index of the first optical compensation layer 14 in the direction of X1 axis, ny1 is the in-plane refractive index of the first optical compensation layer 14 in the direction of Y1 axis that is perpendicular to the X1 axis, and d1 is a thickness of the first optical compensation layer 14. The in-plane retardation RO1 of the first optical compensation layer 14 may be understood as an actual retardation of light passing through the first optical compensation layer 14 in a normal direction (a thickness direction) of the first optical compensation layer 14.

The in-plane retardation RO1 of the liquid crystal layer 13 is equal to a product of dLC and a difference of nxLC and nyLC (ROLC=(nxLC−nyLC)×dLC), where nxLC is an in-plane refractive index of the liquid crystal layer 13 in the direction of X axis, nyLC is an in-plane refractive index of the liquid crystal layer 13 in the direction of Y axis that is perpendicular to the X axis, and dLC is a thickness of the liquid crystal layer 13. The X axis is the optic axis of the first liquid crystal molecule in the liquid crystal layer 13. It will be noted that, in a case where there is a small pretilt angle (e.g., a pretilt angle within 5°) between the X axis and a plane of the liquid crystal layer 13, the X axis may also be considered to be in the plane of the liquid crystal layer 13. The in-plain retardation ROLC of the liquid crystal layer 13 may be understood as an actual retardation of light passing through the liquid crystal layer 13 in a normal direction (a thickness direction) of the liquid crystal layer 13.

It will be noted that, a relative position of the first optical compensation layer 14 and the liquid crystal layer 13 are not limited herein, and may be determined according to actual needs. For example, the linearly polarized light may pass through the first optical compensation layer 14 first and then pass through the liquid crystal layer 13, or pass through the liquid crystal layer 13 first and then pass through the first optical compensation layer 14.

For example, by adjusting the refractive index of the first optical compensation layer 14 and/or the refractive index of the first liquid crystal molecules in the liquid crystal layer 13, and adjusting the thickness of the first optical compensation layer and/or the thickness of the liquid crystal layer 13, it may be possible to make the sum of the in-plane retardation RO2 of the first optical compensation layer 14 and the in-plane retardation ROLC of the liquid crystal layer 13 equal to the positive integral multiple of the first wavelength.

The first wavelength is in the range of 535 nm±50 nm. That is, a minimum value of the first wavelength is 485 nm, a maximum value thereof is 585 nm, and a median value thereof is 535 nm. In a case where the sum of the in-plane retardation of the first optical compensation layer 14 and the in-plane retardation of the liquid crystal layer 13 is 535 nm, not only that the light leakage caused by pressure at the side viewing angles may be reduced significantly when the liquid crystal display panel 1 is in the L0 state, but also the leaked light also appears to be bluish purple when the liquid crystal display panel 1 is viewed from the side viewing angle. Compared with red, yellow and green color cast, the bluish purple color cast is more acceptable. Therefore, by setting the first wavelength to be in the range of 535 nm±50 nm, it may be possible to further improve the display effect.

In some embodiments, the in-plain retardation RO1 of the first optical compensation layer 14 is in a range of 145 nm to 240 nm; and the in-plain retardation ROLC of the liquid crystal layer 13 is in a range of 310 nm to 390 nm. For example, the in-plane retardation RO1 of the first optical compensation layer 14 is 145 nm, 160 nm, 180 nm, 200 nm, 210 nm, 220 nm or 240 nm. The in-plain retardation ROLC of the liquid crystal layer 13 is, for example, 310 nm, 330 nm, 350 nm, 380 nm or 390 nm. In the case where the in-plane retardation RO1 of the first optical compensation layer 14 is in the range of 145 nm to 240 nm, a positive compensation effect of the first optical compensation layer 14 is good. By combining such an in-plane retardation RO1 of the first optical compensation layer 14 with a suitable in-plane retardation ROLC of the liquid crystal layer 13, it may be possible to offer a variety of combinations of the first optical compensation layer 14 and the liquid crystal layer 13, and ensure a good display effect of the liquid crystal display panel 1.

In some embodiments, the in-plain retardation RO1 of the first optical compensation layer 14 is in a range of 185 nm±5 nm, and the in-plain retardation ROLC of the liquid crystal layer 13 is in a range of 350 nm±5 nm. For example, a minimum value of the in-plain retardation RO1 of the first optical compensation layer 14 is 180 nm, a maximum value thereof is 190 nm, and a median value thereof is 185 nm. For example, a minimum value of the in-plain retardation ROLC of the liquid crystal layer 13 is 345 nm, a maximum value thereof is 355 nm, and a median value thereof is 350 nm. In the case where the in-plane retardation RO1 of the first optical compensation layer 14 is in a range of 185 nm±5 nm, the positive compensation effect of the first optical compensation layer 14 is even better. By combining such an in-plane retardation of the first optical compensation layer 14 with a suitable in-plane retardation ROLC of the liquid crystal layer 13, it may also be possible to offer a variety of combinations of the first optical compensation layer 14 and the liquid crystal layer 13, and ensure a better display effect of the liquid crystal display panel 1.

The in-plain retardation RO2 of the second optical compensation layer 15 is equal to a product of d2 and a difference of nx2 and ny2 (RO2=(nx2−ny2)×d2), where nx2 is the in-plane refractive index of the second optical compensation layer 15 in the direction of X2 axis, ny2 is the in-plane refractive index of the second optical compensation layer 15 in the direction of Y2 axis that is perpendicular to the X2 axis, and d2 is a thickness of the second optical compensation layer 15. The in-plane retardation RO2 of the second optical compensation layer 15 may be understood as an actual retardation of light passing through the second optical compensation layer 15 in a normal direction (a thickness direction) of the second optical compensation layer 15.

Based on some of the above embodiments, for example, the in-plane retardation RO2 of the second optical compensation layer 15 is in a range of 115 nm±550 nm×N to 200 nm±550 nm×N, where N is an integer equal to or greater than 0. For example, the in-plane retardation RO2 of the second optical compensation layer 15 is 115 nm, 134 nm, 147 nm, 157 nm, 200 nm, or 750 nm.

In this case, it is conducive to reducing green light in the light exiting in directions of side viewing angles, so that the leaked light appears bluish when the liquid crystal display panel 1 is viewed from the side viewing angles. As a result, the liquid crystal display panel 1 has a good display effect. Since 550 nm is close to a wavelength of green light, after the positive integral multiple of 550 nm is added to any value of the range of 115 nm to 200 nm, it may still be possible to reduce the green light in the light exiting in a direction of tilt viewing angles.

For another example, the in-plane retardation RO2 of the second optical compensation layer 15 is in a range of (147±10 nm)+550×N, where N is an integer equal to or greater than 0. The in-plane retardation RO2 of the second optical compensation layer 15 is, for example, 137 nm, 147 nm, 157 nm or 697 nm. In this case, the leaked light appears more bluish when the liquid crystal display panel 1 is viewed from the side viewing angles, and the liquid crystal display panel 1 has a better display effect.

Types of the first optical compensation layer 14 and the second optical compensation layer 15 are determined according to needs of actual application and/or manufacturing, and are not limited in the present disclosure.

In some embodiments, the first optical compensation layer 14 is an optical compensation layer based on liquid crystal molecules or an optical compensation layer based on a stretched polymer film; and/or, the second optical compensation layer 15 is an optical compensation layer based on liquid crystal molecules or an optical compensation layer based on a stretched polymer film.

The polymer film before being stretched may be fabricated by solution casting or melt extrusion or any other film-forming technology known in the art, and the polymer film before being stretched may include a polystyrene film, a polynorbornene film, etc. In some examples, the polymer film before being stretched is a non-liquid crystal polymer film. When the first optical compensation layer 14 is fabricated, the required optical compensation layer may be obtained by stretching the polymer film.

In the case where the second optical compensation layer 15 is the optical compensation layer based on the stretched polymer film, after the first liquid crystal molecules 133' the liquid crystal layer 13 is sealed between the first base 11 and the second base 12, the second optical compensation layer 15 may be directly attached to a surface of the first base 11 or the second base 12 away from the liquid crystal layer 13. This process has the advantage of easy assembling.

Based on this, for example, the second optical compensation layer 15 and a polarizer (e.g., the first polarizer 16 or the second polarizer 17) adjacent thereto may be assembled to become an integral structure. After that, the integral structure may be directly assembled on the surface of the first base 11 or the second base 12 away from the liquid crystal layer 13. This process has the advantage of easy assembling.

In the case where the first optical compensation layer 14 is the optical compensation layer based on the liquid crystal molecules, the processes of manufacturing the liquid crystal display panel may be simplified.

Figure 5A:
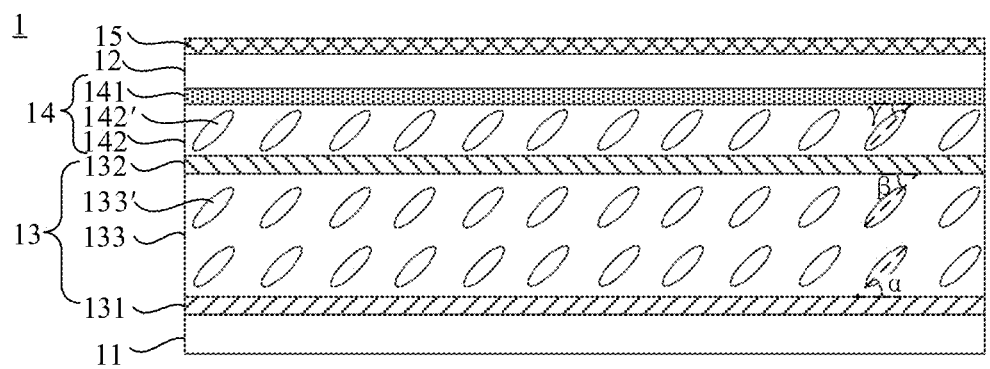
FIG. 5A is a diagram showing a structure of yet another liquid crystal display panel, in accordance with some embodiments.
Figure 5B:
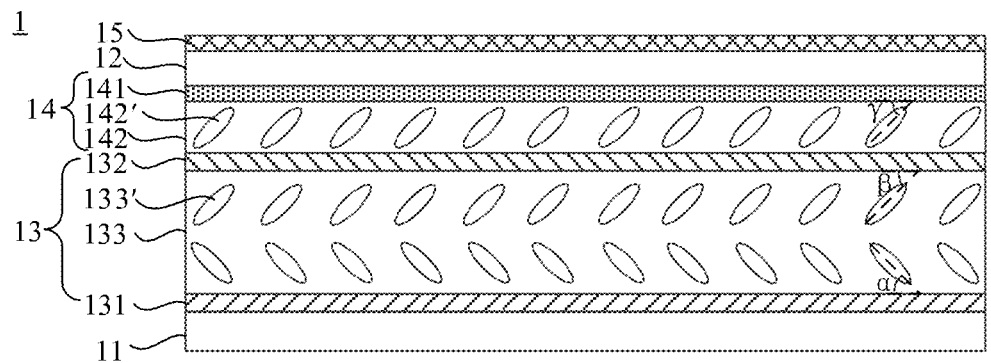
FIG. 5B is a diagram showing a structure of yet another liquid crystal display panel, in accordance with some embodiments.

For example, referring to FIGS. 5A and 5B, the first optical compensation layer 14 includes a third alignment film 141 and a second liquid crystal molecular layer 142. The second liquid crystal molecular layer 142 includes second liquid crystal molecules 142'.

The third alignment film 141 is configured to anchor second liquid crystal molecules 142', in the second liquid crystal molecular layer 142, that are proximate to the third alignment film 141, so that the second liquid crystal molecules 142' proximate to the third alignment film 141 have a third pretilt angle. For example, the second liquid crystal molecules 142' proximate to the third alignment film 141" are a layer of second liquid crystal molecules 142' most proximate to the third alignment film 141. As an illustration, FIGS. 5A and 5B only show the layer of second liquid crystal molecules 142', in the second liquid crystal molecular layer 142, that are most proximate to the third alignment film 141.

In the case where the liquid crystal layer 13 includes the first alignment film 131, the second alignment film 132 and the first liquid crystal molecular layer 133, orthogonal projections of the optic axes of the second liquid crystal molecules 142' in the second liquid crystal molecular layer 142 on the first base 11 is parallel to the orthogonal projections of the optic axes of the first liquid crystal molecules 133' in the liquid crystal layer 13 on the first base 11; and an alignment direction of the third alignment film 141 is the same as the alignment direction of the first alignment film 131.

Figure 6A:
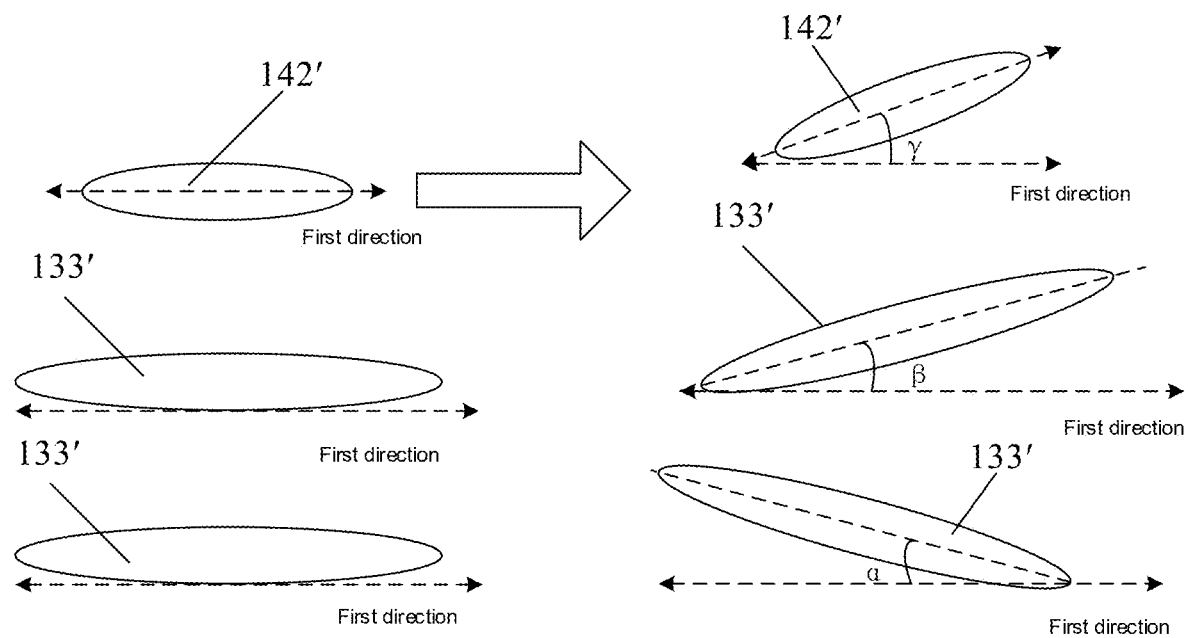
FIG. 6A is a perspective view showing distribution states of first liquid crystal molecules and second liquid crystal molecules, in accordance with some embodiments.

For example, referring to FIG. 6A, the first liquid crystal molecules 133' and the second liquid crystal molecules 142' are all rod-like liquid crystal molecules. In the case where the alignment direction of the third alignment film 141 is parallel to alignment directions of the first alignment film 131 and the second alignment film 132, a long axis of the second liquid crystal molecule 142' without a pretilt angle and the long axis of the first liquid crystal molecule 133' without a pretilt angle are parallel to each other, and a layer of first liquid crystal molecules 133' proximate to the second liquid crystal molecules 142' and a layer of first liquid crystal molecules 133' away from the second liquid crystal molecules 142' are parallel to each other. When the layer of first liquid crystal molecules 133' away from the second liquid crystal molecules 142' have a first pretilt angle α, the layer of first liquid crystal molecules 133' proximate to the second liquid crystal molecules 142' have a second pretilt angle β, and the layer of the second liquid crystal molecules 142' have a third pretilt angle γ, orthogonal projections of long axes of the layer of second liquid crystal molecules 142' on the first base 11 are parallel to orthogonal projections of long axes of the two layers of first liquid crystal molecules 133' on the first base 11. The first pretilt angle α is an acute angle between a long axis direction of the first liquid crystal molecule 133' in the layer of the first liquid crystal molecules 133' away from the second liquid crystal molecules 142' and a first direction, the second pretilt angle ß is an acute angle between the long axis direction of the first liquid crystal molecule 133' in the layer of first liquid crystal molecules 133' proximate to the second liquid crystal molecules 142' and the first direction, and the third pretilt angle γ is an acute angle between a long axis direction of the second liquid crystal molecule 142' in the layer of the second liquid crystal molecules 142' and a second direction.

It will be understood by those skilled in the art that, since the pretilt angles of the second liquid crystal molecule 142' and the first liquid crystal molecule 133' are both small, the second liquid crystal molecule 142' with a pretilt angle is parallel to the first liquid crystal molecule 133' with a pretilt angle. The description that the second liquid crystal molecule 142' is parallel to the first liquid crystal molecule 133' may be understood as that, the long axis direction of the second liquid crystal molecule 142' is parallel to the long axis direction of the first liquid crystal molecule 133'.

With continued reference to FIG. 6A, in a case where the alignment directions of the first alignment film 131, the second alignment film 132 and the third alignment film 141 are certain, although the first pretilt angle α, the second pretilt angle β and the third pretilt angle γ may change in a range of 0° to 180°, the acute angle between the long axis direction of the liquid crystal molecule and the alignment direction of the alignment film is only referred to as the pretilt angle for the convenience of forming, measuring and describing the pretilt angle. After the long axis direction of the liquid crystal molecule rotates in a direction around a vertex of the pretilt angle thereof by the pretilt angle, the long axis direction of the liquid crystal molecule will be parallel to the alignment direction of the alignment film, and the direction in which the long axis direction rotates is defined as a direction of the pretilt angle. The clockwise direction is defined as a forward direction, and the counterclockwise direction is defined as a reverse direction.

Figure 6B:
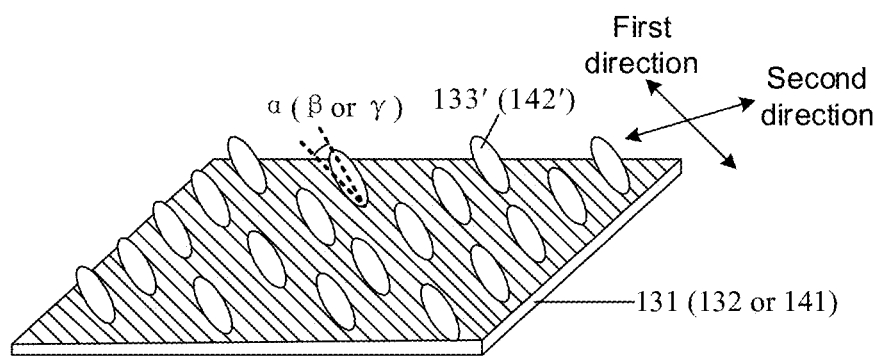
FIG. 6B is a diagram showing a structure of a first alignment film (a second alignment film or a third alignment film), in accordance with some embodiments.

The alignment film is made of a polymer material, such as polyimide (PI). As shown in FIG. 6B, alignment directions of alignment films (including the first alignment film 131, the second alignment film 132 and the third alignment film 141) include the first direction or the second direction. The pretilt angles are included angles formed between long axis directions of liquid crystal molecules (including the first liquid crystal molecule 133' and the second liquid crystal molecule 142') and the alignment directions of the alignment films. For example, as shown in FIGS. 6B and 6C, the first direction and the second direction are perpendicular to each other, and the first direction and the second direction are parallel to the plane where the alignment film is located.

For example, referring to FIG. 6B, in a case where the alignment directions of the first alignment film 131, the second alignment film 132 and the third alignment film 141 are all the first direction, an angle between the long axis direction of the first liquid crystal molecule 133' and the first direction is the first pretilt angle α or the second pretilt angle β, and an angle between the long axis direction of the second liquid crystal molecule 142' and the first direction is the third pretilt angle γ.

Figure 6C:
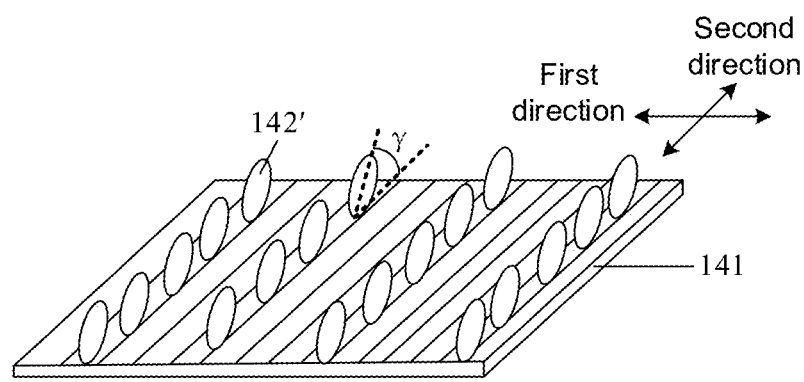
FIG. 6C is a diagram showing a structure of a third alignment film, in accordance with some embodiments.

For another example, referring to FIG. 6C, in a case where the alignment direction of the third alignment film 141 is the second direction, an angle between the long axis direction of the second liquid crystal molecule 142' and the second direction is the third pretilt angle γ. In this case, the alignment directions of the first alignment film 131 and the second alignment film 132 are also the second direction, so that the orthogonal projection of the optic axis of the first optical compensation layer 14 on the first base 11 is parallel to the orthogonal projections of the optic axes of the first liquid crystal molecules 133' in the liquid crystal layer 13 on the first base 11.

The first alignment film 131, the second alignment film 132 and the third alignment film 141 may all be formed through a rubbing alignment process. Rubbing directions of the first alignment film 131, the second alignment film 132 and the third alignment film 141 may determine the alignment directions of the first alignment film 131, the second alignment film 132 and the third alignment film 141, and information of the pretilt angles. That is, the rubbing direction may determine the alignment direction and the direction of the pretilt angle.

Figure 6D:
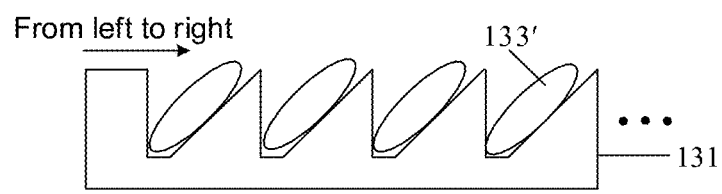
FIG. 6D is a sectional view of a first alignment film, in accordance with some embodiments.
Figure 6E:
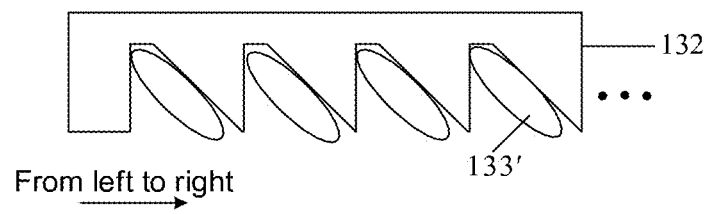
FIG. 6E is a sectional view of a second alignment film, in accordance with some embodiments.

For example, referring to FIGS. 6D and 6E, in the rubbing alignment process, oblique upward slopes are formed on an upper surface (i.e., a surface proximate to the first liquid crystal molecules 133') of the alignment film (e.g., the first alignment film 131) relative to its lower surface (i.e., a surface away from the first liquid crystal molecules 133'). For example, referring to FIGS. 6D and 6E, when rubbing is performed from left to right, slopes oblique to upper right or oblique to lower right may be formed from left to right in the alignment direction of the alignment film (the first alignment film 131 or the second alignment film 132). The first alignment film 131 and the second alignment film 132 may be fabricated through a same process in practice. In a fabrication process, a state of the first alignment film 131 is as shown in FIG. 6D. In a using process, as shown in FIG. 5B, the first alignment film 131 and the second alignment film 132 are arranged opposite to each other, and thus the directions of the first pretilt angle α and the second pretilt angle β are different; but in actual fabrication process, the rubbing direction of the first alignment film 131 is the same as the rubbing direction of the second alignment film 132.

Figure 6F:
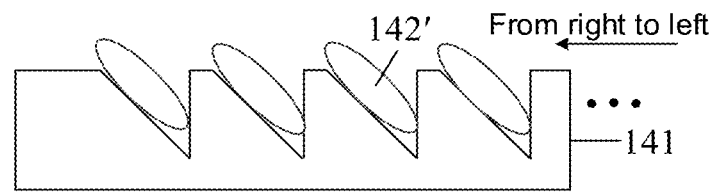
FIG. 6F is a sectional view of a third alignment film, in accordance with some embodiments.
Figure 7:
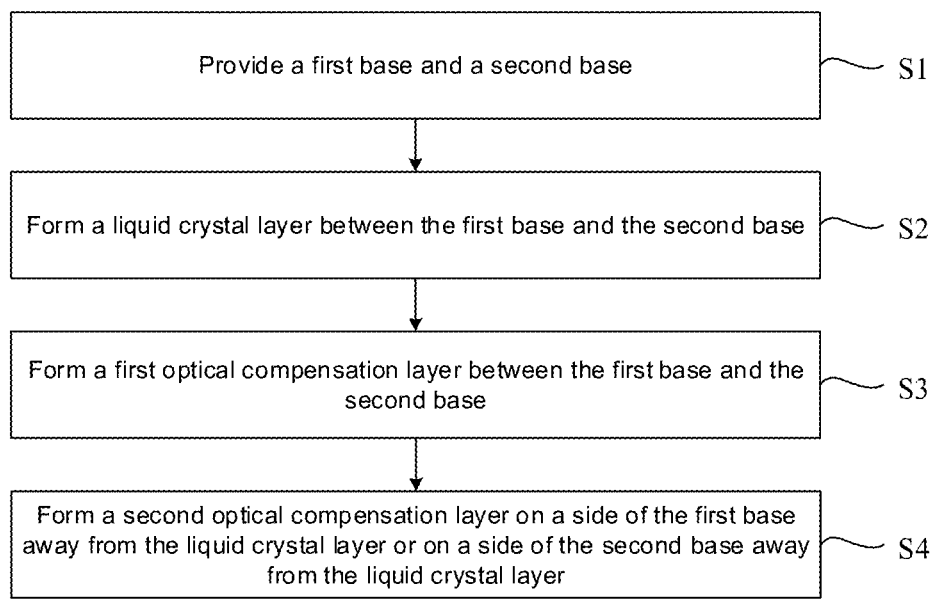
FIG. 7 is a flow diagram of a method of manufacturing a liquid crystal display panel, in accordance with some embodiments.

In a case where the alignment direction of the third alignment film 141 is the same as the alignment directions of the first alignment film 131 and the second alignment film 132, rubbing may be performed from left to right, or from right to left. When rubbing is performed from left to right, slopes formed on a rubbed surface of the third alignment film 141 oblique to upper right or oblique to lower right will appear from left to right in the alignment direction of the third alignment film 141. When rubbing is performed from right to left, slopes formed on the rubbed surface of the third alignment film 141 oblique to upper left (as shown in FIG. 6F) or oblique to lower left will appear from right to left in the alignment direction of the third alignment film 141. Based on this, the second liquid crystal molecules 142' proximate to the third alignment film 141 may have the third pretilt angle γ under action of the third alignment film 141. Therefore, the rubbing directions of the first alignment film 131, the second alignment film 132 and the third alignment film 141 may determine the alignment directions of the first alignment film 131, the second alignment film 132 and the third alignment film 141, so as to determine the directions of the pretilt angles of corresponding liquid crystal molecules.

It is worth noting that, each alignment direction mentioned in the embodiments of the present disclosure may include two rubbing directions. For example, in the case where the alignment direction is the first direction, rubbing may be performed not only from one end to the other end in the first direction (as shown in FIG. 6D), but also along a path opposite to the path of "from one end to the other end" (as shown in FIG. 6F).

Based on the above, it will be understood by those skilled in the art that, the rubbing direction may determine the direction of the pretilt angle. When the alignment directions of the alignment films are the same, if the rubbing directions are different, the directions of the pretilt angles may be different. For example, when the alignment directions of the alignment films are all the first direction, the directions of the pretilt angles formed when rubbing is performed from left to right and when rubbing is performed from right to left are opposite.

In some embodiments, the directions of the first pretilt angle α and the second pretilt angle β are the same. For example, the directions of the first pretilt angle α and the second pretilt angle β are both the forward direction (as shown in FIG. 5A); or the directions of the first pretilt angle α and the second pretilt angle β are both the reverse direction. Based on this, the directions of the third pretilt angle γ and the first pretilt angle α are the same. For example, when the directions of the first pretilt angle α and the second pretilt angle β are both the forward direction, the direction of the third pretilt angle γ is also the forward direction (as shown in FIG. 5A). For another example, when the directions of the first pretilt angle α and the second pretilt angle β are both the reverse direction, the direction of the third pretilt angle γ is also the reverse direction.

In some other embodiments, when the directions of the first pretilt angle α and the second pretilt angle β are the same, the direction of the third pretilt angle γ may be opposite to the direction of the first pretilt angle α.

In yet some other embodiments, the direction of the first pretilt angle α is opposite to the direction of the second pretilt angle β. For example, the direction of the first pretilt angle α is the forward direction, and the direction of the second pretilt angle β is the reverse direction. Alternatively, referring to FIGS. 5B and 6A, the direction of the first pretilt angle α is the reverse direction, and the second pretilt angle β is the forward direction. Based on this, it may be arranged that the direction of the third pretilt angle γ is the same as the direction of the first pretilt angle α, or the direction of the third pretilt angle γ is the same as the direction of the second pretilt angle ß (as shown in FIG. 5B).

In some embodiments, the first pretilt angle α, the second pretilt angle ß and the third pretilt angle γ are equal in magnitude.

For example, the description that the first pretilt angle α, the second pretilt angle β and the third pretilt angle γ are equal in magnitude means that, the pretilt angles are equal in degrees, regardless of the alignment directions of the alignment films (including the first alignment film 131, the second alignment film 132 and the third alignment film 141). No matter whether the alignment direction of the third alignment film 141 is the same as the alignment directions of the first alignment film 131 and the second alignment film 132, a magnitude of the third pretilt angle γ may be set to be equal to or approximately equal to a magnitude of the first pretilt angle α or the second pretilt angle β.

In a case where the first pretilt angle α, the second pretilt angle β and the third pretilt angle γ are equal or approximately equal in degrees, the difficulty of fabricating the alignment films may be reduced.

In some embodiments, the first pretilt angle α, the second pretilt angle β and the third pretilt angle γ are in a range of 2°±2° (i.e., a maximum value thereof is 4°, a minimum value thereof is 0°, and a median value thereof is 2°). In some examples, the first pretilt angle α, the second pretilt angle β and the third pretilt angle γ are in a range of 2°±1° (i.e., a maximum value thereof is 3°, a minimum value thereof is 1°, and a median value thereof is 2°). For example, the first pretilt angle α, the second pretilt angle β and the third pretilt angle γ are all 1°. For another example, the first pretilt angle α, the second pretilt angle β and the third pretilt angle γ are all 2°. For yet another example, the first pretilt angle α, the second pretilt angle β and the third pretilt angle γ are all 3°.

Since the first pretilt angle α, the second pretilt angle β and the third pretilt angle γ are all small, for example, 1°, even if the direction of the first pretilt angle α is different from the direction of the second pretilt angle β, the long axis direction of the first liquid crystal molecules 133' proximate to the first alignment film 131 is approximately parallel to the long axis direction of the first liquid crystal molecules 133' proximate to the second alignment film 132. In a case where the alignment direction of the third alignment film 141 is the same as the alignment direction of the first alignment film 131, the long axis direction of the second liquid crystal molecules 142' is approximately the same as the long axis direction of the first liquid crystal molecules 133'. The long axis direction of the second liquid crystal molecules 142' is parallel to the long axis direction of the first liquid crystal molecules 133', so that the first optical compensation layer 14 may realize positive compensation on the liquid crystal layer 13, and the light leakage problem of the liquid crystal display panel 1 in the L0 state and the color cast problem of the liquid crystal display panel 1 may be ameliorated.

Based on the above, regardless of the magnitudes of the first pretilt angle α and the second pretilt angle β, orthogonal projections of the long axes of the first liquid crystal molecules 133' on a plane where the first alignment film 131, the second alignment film 132 or the third alignment film 141 is located are in the first direction. Regardless of the magnitude of the third pretilt angle γ, in a case where the alignment direction of the third alignment film 141 is the same as the alignment directions of the first alignment film 131 and the second alignment film 132, the orthogonal projections of the long axes of the second liquid crystal molecules 142' on the plane where the first alignment film 131, the second alignment film 132 or the third alignment film 141 is located are in the first direction. Therefore, even if the formed first pretilt angle α, second pretilt angle β and third pretilt angle γ are different in magnitude, it may be possible to ensure normal operation of the liquid crystal layer 13 and the first optical compensation layer 14, which reduces requirements on the process for fabricating the first pretilt angle α, the second pretilt angle β and the third pretilt angle γ.

In some embodiments, the first liquid crystal molecules are negative liquid crystal molecules. Since the liquid crystal display panel adopting the negative liquid crystal molecules may have a high light transmittance in an L255 state (a bright state), the liquid crystal display panel 1 adopting the negative liquid crystal molecules has a high contrast ratio and a good display effect.

In some embodiments, a material of the first optical compensation layer 14 and a material of the second optical compensation layer 15 are both a material with positive dispersion; or the material of the first optical compensation layer 14 is a material with positive dispersion, and the material of the second optical compensation layer 15 is a material with negative dispersion; or the material of the first optical compensation layer 14 is a material with negative dispersion, and the material of the second optical compensation layer 15 is a material with positive dispersion.

It will be noted that, in a case where the material of the first optical compensation layer 14 is the material with positive dispersion, after light traveling in a side viewing angle passes through the liquid crystal layer 13 and the first optical compensation layer 14, a ratio of red light is the highest, a ratio of green light is in the middle, and a ratio of blue light is the lowest. Based on this, in a case where the orthogonal projection of the optic axis of the second optical compensation layer 15 on the first base 11 is perpendicular to the orthogonal projection of the optic axis of the first optical compensation layer 14 on the first base 11, no matter whether a material of the second optical compensation layer 15 is a material with positive dispersion, or whether the material of the second optical compensation layer 15 is a material with negative dispersion, the second optical compensation layer 15 has a function of balancing the ratios of red light, green light and blue light in the light.

For the material with positive dispersion, the longer the wavelength of light passing through the material, the smaller the Δn; for the material with negative dispersion, the longer the wavelength of light passing through the material, the greater the Δn. Therefore, in a case where the orthogonal projection of the optic axis of the second optical compensation layer 15 on the first base 11 is perpendicular to the orthogonal projection of the optic axis of the first optical compensation layer 14 on the first base 11, and the material of the first optical compensation layer 14 is the material with positive dispersion, by selecting the material with positive dispersion as the material of the second optical compensation layer 15, it may be possible to better balance the ratio of red light and the ratio of blue light in the light. That is, it may be possible to reduce the ratio of red light in the light traveling in a side viewing angle and increase the ratio of blue light in the light traveling in the side viewing angle. In this way, color cast at the side viewing angle may be bluish color cast, which is more acceptable to the human eye.

In a case where the material of the first optical compensation layer 14 is the material with negative dispersion, by selecting the material with positive dispersion as the material of the second optical compensation layer 15, it may be possible to more effectively balance the ratio of red light and the ratio of blue light in the light.

Based on the liquid crystal display panel 1 provided in some embodiments, referring to FIG. 1, in the display device 100 provided in some embodiments of the present disclosure, the backlight module 2 is disposed on a side of the liquid crystal display panel 1.

In a case where the liquid crystal display panel 1 includes the first polarizer 16 and the second polarizer 17, and orthogonal projections of the optic axes of the first liquid crystal molecules 133' in the liquid crystal layer 13 on the first polarizer 16 are parallel to the transmission axis of the first polarizer 16, for example, as shown in FIGS. 1 and 2A, the backlight module 2 is located on a side of the first polarizer 16 away from the liquid crystal layer 13, and the first optical compensation layer 14 and the second optical compensation layer 15 are both located on a side of the liquid crystal layer 13 away from the first polarizer 16.

Here, the light leakage problem in the L0 state and the color cast problem at the side viewing angle of the display device 100 having the liquid crystal display panel 1 may be significantly ameliorated, and thus the display device 100 has a good display effect.

In a case where the liquid crystal display panel 1 includes the first polarizer 16 and the second polarizer 17, and the orthogonal projections of the optic axes of the first liquid crystal molecules 133' in the liquid crystal layer 13 on the first polarizer 16 is perpendicular to the transmission axis of the first polarizer 16, for example, as shown in FIGS. 1 and 2C, the backlight module 2 is located on the side of the first polarizer 16 away from the liquid crystal layer 13, the first optical compensation layer 14 is located on the side of the liquid crystal layer 13 away from the first polarizer 16, and the second optical compensation layer 15 is located on a side of the liquid crystal layer 13 proximate to the first polarizer 16.

Here, the light leakage problem in the L0 state and the color cast problem at the side viewing angle of the display device 100 having the liquid crystal display panel 1 may also be significantly ameliorated, and thus the display device 100 has a good display effect.

Some embodiments of the present disclosure provide a method of manufacturing a liquid crystal display panel 1. Referring to FIGS. 2A to 2C, and 9, the method includes steps 1 to 4 (S1 to S4).

In S1, a first base 11 and a second base 12 are provided.

In S2, a liquid crystal layer 13 is formed between the first base 11 and the second base 12.

In S3, a first optical compensation layer 14 is formed between the first base 11 and the second base 12. For example, the first optical compensation layer 14 is formed between the first base 11 and the liquid crystal layer 13 or between the second base 12 and the liquid crystal layer 13. Here, an orthogonal projection of an optic axis of the first optical compensation layer 14 on the first base 11 is parallel to orthogonal projections of optic axes of the liquid crystal molecules in the liquid crystal layer 12 on the first base 11.

In S4, a second optical compensation layer 12 is formed on a side of the first base 11 away from the liquid crystal layer 13 or on a side of the second base 12 away from the liquid crystal layer 13. Here, an orthogonal projection of an optic axis of the second optical compensation layer 15 on the first base 11 is perpendicular to the orthogonal projection of the optic axis of the first optical compensation layer 14 on the first base 11.

The liquid crystal display panel 1 provided in some embodiments of the present disclosure may be obtained through the above method, and the light leakage problem in the L0 state and the color cast problem of the liquid crystal display panel 1 may be significantly ameliorated.

The foregoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A liquid crystal display panel, comprising:
   a first base;
   a second base disposed opposite to the first base;
   a liquid crystal layer disposed between the first base and the second base;
   a first optical compensation layer disposed between the first base and the second base, an orthogonal projection of an optic axis of the first optical compensation layer on the first base being parallel to orthogonal projections of optic axes of liquid crystal molecules in the liquid crystal layer on the first base; and
   a second optical compensation layer disposed on a side of the first base away from the liquid crystal layer, or disposed on a side of the second base away from the liquid crystal layer, an orthogonal projection of an optic axis of the second optical compensation layer on the first base being perpendicular to the orthogonal projection of the optic axis of the first optical compensation layer on the first base, wherein
   a material of the first optical compensation layer and a material of the second optical compensation layer are both a material with positive dispersion; or
   a material of the first optical compensation layer is a material with positive dispersion, and a material of the second optical compensation layer is a material with negative dispersion; or
   a material of the first optical compensation layer is a material with negative dispersion, and a material of the second optical compensation layer is a material with positive dispersion; wherein
   a sum of an in-plane retardation of the first optical compensation layer and an in-plane retardation of the liquid crystal layer is equal to a positive integral multiple of a first wavelength, the first wavelength being in a range of 535 nm±50 nm;
   the in-plane retardation of the first optical compensation layer is in a range of 190 nm to 240 nm; and the in-plane retardation of the liquid crystal layer is in a range of 310 nm to 390 nm;
   an in-plane retardation of the second optical compensation layer is in a range of 134 nm to 200 nm+550 nm×N, N being an integer greater than or equal to 0.

2. The liquid crystal display panel according to claim 1, wherein the in-plane retardation of the second optical compensation layer is in a range of (147 nm±10 nm)+550 nm×N, N being an integer greater than or equal to 0.

3. The liquid crystal display panel according to claim 1, wherein the first optical compensation film is a +A compensation film layer; and/or
   the second optical compensation film is a +A compensation film layer.

4. The liquid crystal display panel according to claim 1, wherein the first optical compensation layer and the second optical compensation layer are located on a same side of the liquid crystal layer; or
   the first optical compensation layer and the second optical compensation layer are located on two sides of the liquid crystal layer.

5. The liquid crystal display panel according to claim 1, further comprising:
   a first polarizer located on the side of the first base away from the liquid crystal layer; and
   a second polarizer located on the side of the second base away from the liquid crystal layer, a transmission axis of the second polarizer being perpendicular to a transmission axis of the first polarizer, wherein
   orthogonal projections of the optic axes of the liquid crystal molecules in the liquid crystal layer on the first polarizer are parallel to or perpendicular to the transmission axis of the first polarizer.

6. The liquid crystal display panel according to claim 1, wherein the first optical compensation layer is an optical compensation layer based on liquid crystal molecules or an optical compensation layer based on a stretched polymer film; and/or the second optical compensation layer is an optical compensation layer based on liquid crystal molecules or an optical compensation layer based on a stretched polymer film.

7. The liquid crystal display panel according to claim 1, wherein the liquid crystal display panel is of a planar structure or a curved structure.

8. A display device, comprising:
the liquid crystal display panel according to claim 1; and
a backlight module disposed on a side of the liquid crystal display panel.

9. The display device according to claim 8, wherein the liquid crystal display panel includes a first polarizer located on a side of the first base away from the liquid crystal layer, and a second polarizer located on a side of the second base away from the liquid crystal layer, a transmission axis of the second polarizer being perpendicular to a transmission axis of the first polarizer; orthogonal projections of the optic axes of the liquid crystal molecules in the liquid crystal layer on the first polarizer are parallel to the transmission axis of the first polarizer;
and the backlight module is located on a side of the first polarizer away from the liquid crystal layer, and the first optical compensation layer and the second optical compensation layer are both located on a side of the liquid crystal layer away from the first polarizer.

10. The display device according to claim 8, wherein the liquid crystal display panel includes a first polarizer located on a side of the first base away from the liquid crystal layer, and a second polarizer located on a side of the second base away from the liquid crystal layer, a transmission axis of the second polarizer being perpendicular to a transmission axis of the first polarizer; orthogonal projections of the optic axes of the liquid crystal molecules in the liquid crystal layer on the first polarizer are perpendicular to the transmission axis of the first polarizer; and the backlight module is located on a side of the first polarizer away from the liquid crystal layer, the first optical compensation layer is located on a side of the liquid crystal layer away from the first polarizer, and the second optical compensation layer is located on a side of the liquid crystal layer proximate to the first polarizer.

11. A liquid crystal display panel, comprising:
a first base;
a second base disposed opposite to the first base;
a liquid crystal layer disposed between the first base and the second base;
a first optical compensation layer disposed between the first base and the second base, an orthogonal projection of an optic axis of the first optical compensation layer on the first base being parallel to orthogonal projections of optic axes of liquid crystal molecules in the liquid crystal layer on the first base; and
a second optical compensation layer disposed on a side of the first base away from the liquid crystal layer, or disposed on a side of the second base away from the liquid crystal layer, an orthogonal projection of an optic axis of the second optical compensation layer on the first base being perpendicular to the orthogonal projection of the optic axis of the first optical compensation layer on the first base, wherein
a sum of an in-plane retardation of the first optical compensation layer and an in-plane retardation of the liquid crystal layer is equal to a positive integral multiple of a first wavelength, the first wavelength being in a range of 535 nm±50 nm;
the in-plane retardation of the first optical compensation layer is in a range of 160 nm to 190 nm; and the in-plane retardation of the liquid crystal layer is in a range of 310 nm to 390 nm; and
an in-plane retardation of the second optical compensation layer is in a range of 134 nm to 200 nm+550 nm×N, N being an integer greater than or equal to 0.

12. The liquid crystal display panel according to claim 11, wherein the first optical compensation film is a +A compensation film layer; and/or
the second optical compensation film is a +A compensation film layer.

13. The liquid crystal display panel according to claim 11, wherein a material of the first optical compensation layer and a material of the second optical compensation layer are both a material with positive dispersion; or
a material of the first optical compensation layer is a material with positive dispersion, and a material of the second optical compensation layer is a material with negative dispersion; or
a material of the first optical compensation layer is a material with negative dispersion, and a material of the second optical compensation layer is a material with positive dispersion.

14. The liquid crystal display panel according to claim 11, further comprising:
a first polarizer located on the side of the first base away from the liquid crystal layer; and
a second polarizer located on the side of the second base away from the liquid crystal layer, a transmission axis of the second polarizer being perpendicular to a transmission axis of the first polarizer, wherein
orthogonal projections of the optic axes of the liquid crystal molecules in the liquid crystal layer on the first polarizer are parallel to or perpendicular to the transmission axis of the first polarizer.

15. A display device, comprising:
the liquid crystal display panel according to claim 12; and
a backlight module disposed on a side of the liquid crystal display panel.

16. The liquid crystal display panel according to claim 11, wherein the first optical compensation layer and the second optical compensation layer are located on a same side of the liquid crystal layer; or
the first optical compensation layer and the second optical compensation layer are located on two sides of the liquid crystal layer.

17. The liquid crystal display panel according to claim 11, wherein the first optical compensation layer is an optical compensation layer based on liquid crystal molecules or an optical compensation layer based on a stretched polymer film; and/or
the second optical compensation layer is an optical compensation layer based on liquid crystal molecules or an optical compensation layer based on a stretched polymer film.

18. The liquid crystal display panel according to claim 11, wherein the liquid crystal display panel is of a planar structure or a curved structure.

19. A method of manufacturing a liquid crystal display panel, comprising:
providing a first base and a second base;
forming a liquid crystal layer between the first base and the second base;

forming a first optical compensation layer between the first base and the second base, an orthogonal projection of an optic axis of the first optical compensation layer on the first base being parallel to orthogonal projections of optic axes of liquid crystal molecules in the liquid crystal layer on the first base; and forming a second optical compensation layer on a side of the first base away from the liquid crystal layer or on a side of the second base away from the liquid crystal layer, an orthogonal projection of an optic axis of the second optical compensation layer on the first base being perpendicular to the orthogonal projection of the optic axis of the first optical compensation layer on the first base, wherein a material of the first optical compensation layer and a material of the second optical compensation layer are both a material with positive dispersion; or a material of the first optical compensation layer is a material with positive dispersion, and a material of the second optical compensation layer is a material with negative dispersion; or a material of the first optical compensation layer is a material with negative dispersion, and a material of the second optical compensation layer is a material with positive dispersion; wherein a sum of an in-plane retardation of the first optical compensation layer and an in-plane retardation of the liquid crystal layer is equal to a positive integral multiple of a first wavelength, the first wavelength being in a range of 535 nm±50 nm;

the in-plane retardation of the first optical compensation layer is in a range of 190 nm to 240 nm; and the in-plane retardation of the liquid crystal layer is in a range of 310 nm to 390 nm; and an in-plane retardation of the second optical compensation layer is in a range of 134 nm to 200 nm+550 nm×N, N being an integer greater than or equal to 0.

* * * * *

UNITED STATES PATENT AND TRADEMARK OFFICE
CERTIFICATE OF CORRECTION

| | | |
|---|---|---|
| PATENT NO. | : 12,411,383 B2 | Page 1 of 1 |
| APPLICATION NO. | : 18/434904 | |
| DATED | : September 9, 2025 | |
| INVENTOR(S) | : Lintao Ji et al. | |

It is certified that error appears in the above-identified patent and that said Letters Patent is hereby corrected as shown below:

In the Claims

Column 26, Line 41, Claim 15, delete "claim 12;" and insert -- claim 11; --

Signed and Sealed this
Fourth Day of November, 2025

John A. Squires
*Director of the United States Patent and Trademark Office*